United States Patent
Fontana et al.

(10) Patent No.: US 7,121,856 B2
(45) Date of Patent: Oct. 17, 2006

(54) DEVICE FOR CONNECTION OF BUSBARS TO EQUIPMENT OF AN ELECTRICAL SWITCHBOARD

(75) Inventors: Rodolfo Fontana, Clivio (IT); Giuseppe Morini, Brescia (IT)

(73) Assignee: ABB Service S.R.L., (IT)

( * ) Notice: Subject to any disclaimer, the term of this patent is extended or adjusted under 35 U.S.C. 154(b) by 0 days.

(21) Appl. No.: 11/013,714

(22) Filed: Dec. 17, 2004

(65) Prior Publication Data
US 2005/0136719 A1 Jun. 23, 2005

(30) Foreign Application Priority Data
Dec. 17, 2003 (IT) .......................... BG2003A0059

(51) Int. Cl.
*H01R 4/60* (2006.01)
(52) U.S. Cl. .................................................. 439/212
(58) Field of Classification Search ........ 439/212–213, 439/650
See application file for complete search history.

(56) References Cited

U.S. PATENT DOCUMENTS

| | | | | |
|---|---|---|---|---|
| 4,916,574 A | * | 4/1990 | Hancock et al. | 361/649 |
| 5,162,616 A | * | 11/1992 | Swaffield et al. | 174/99 B |
| 6,142,807 A | * | 11/2000 | Faulkner | 439/212 |
| 6,361,333 B1 | * | 3/2002 | Cash, Jr. | 439/106 |
| 6,549,428 B1 | * | 4/2003 | Fontana et al. | 361/825 |

* cited by examiner

*Primary Examiner*—Hae Moon Hyeon
(74) *Attorney, Agent, or Firm*—Connolly Bove Lodge & Hutz LLP

(57) ABSTRACT

A device for connection of a plurality of busbars to at least one apparatus of an electrical switchboard. The device comprises mechanical-coupling means to the busbars. The mechanical-coupling means further comprise at least one first element made of insulating material having a shaped body, on which there are defined housing seats, designed to couple each with corresponding busbars insulating them from one another. In addition the device further comprises connection means, operatively coupled to the at least one first element so as to enable direct electrical connection between the busbars and the at least one apparatus.

19 Claims, 5 Drawing Sheets

DEVICE FOR CONNECTION OF BUSBARS TO EQUIPMENT OF AN ELECTRICAL SWITCHBOARD

CROSS-REFERENCE TO RELATED APPLICATIONS

This application claims the benefit of Italian Application No. BG 2003 A 000059, filed on Dec. 17, 2003 by FONTANA, Rodolfo, et al., entitled "A DEVICE FOR CONNECTION OF BUSBARS TO EQUIPMENT OF AN ELECTRICAL SWITCHBOARD", the entire contents of which are hereby incorporated by reference, and for which priority benefit is claimed under 35 U.S.C. §119.

DESCRIPTION

The present invention relates to a device for connection of a plurality of busbars to at least one apparatus of an electrical switchboard.

It is known that in low-voltage electrical systems, i.e., ones with operating voltages of up to 1 kV, for distribution of electric power to a number of connected loads, for example, control-instrumentation machinery, circuit branches, loads of various nature, etc., purposely designed electrical distribution switchboards are used.

The above switchboards, in their essential parts, are constituted by: a cabinet of a normally cubic shape, which is provided with a frame having the function of structural support for the various components; a system of busbars arranged usually parallel to one another and connected each to a corresponding polarity of the supply-source network; and one or more pieces of electrical equipment, principally switches, connected, on the one hand, to the loads to which the electric power is to be distributed and, on the other, to the bars according to a wide range of configurations; there are then other components, such as panels, guides or supporting plates etc., which complete the switchboard.

The modalities with which the connections between bars and equipment are made are particularly important both as regards the economic aspect, by virtue of the number of components to be used and the corresponding times for assembly, and above all as far as the functional aspect is concerned. In fact, said connections, in addition to providing proper mechanical coupling between the parts, must above all guarantee optimal electrical connection between the components in such a way that the electrical functionality during service will be free from faults. The foregoing must be obtained so as to meet certain given degrees of protection and safety according to what is set down by national and international standards currently in force.

Currently, the modalities with which the bars are connected to the electrical equipment, albeit achieving the required functions, are not altogether satisfactory above all as regards the number of components used, the times and difficulties of assembly.

In particular, the connection between busbars and equipment is generally obtained using a large number of elements which are used in a functionally separate way from one another. Some of them are in fact specifically dedicated to just electrical conduction, others to mechanical connection, others still just to protection and safety. For example, a typical solution envisages the use for the electrical part of purposely designed conductors constituted by rigid elements, such as flat bars, or else by flexible elements, such as laminas, or by a mixed use of the two types. In the assembly stage, said conductive elements are then mechanically fixed to the bars and to the equipment by means of further adapting components, e.g., junctions, adaptors etc., and finally fixed together and to the components, usually by means of screws. Particularly troublesome is the connection to the electrical equipment considering the restricted space available. Finally, additional components are used that will enable shielding and protection of the live connected parts so as to prevent dangers due to possible malfunctioning or inadvertent interventions; for example, insulating sheaths, separator panels, etc. are used. Not to be neglected is the fact that said known solutions lead to cumbersome configurations that do not enable an optimal use of the space within the cabinet of the switchboard.

A primary task of the present invention is to provide a connection device which will be able to overcome the drawbacks of the known art, and in particular which, as compared to known solutions, will enable provision of an operative connection between bars and apparatus that is simplified and improved both from the mechanical standpoint and from the electrical standpoint.

In the framework of this task, a purpose of the present invention is to provide a device for the connection of a plurality of busbars to at least one apparatus that will enable a substantially direct electromechanical coupling between the bars and the apparatus.

A further purpose of the present invention is to provide a device for the connection of a plurality of busbars to at least one apparatus, the structure of which may be obtained with an optimized number of parts that can be coupled together in a simplified and functionally interdependent way as compared to solutions of a known type.

Another purpose of the present invention is to provide a connection device for busbars in a cabinet for an electrical switchboard that is suited to a simplified assembly and will enable optimized exploitation of the space available. Not the least important purpose of the present invention is to provide a connection device for busbars in a cabinet for an electrical switchboard that will present high reliability, and will be relatively easy to manufacture at competitive costs.

The above task, as well as the above and other purposes that will emerge more clearly from what follows, are achieved by a device for the connection of a plurality of busbars to at least one apparatus of an electrical switchboard, characterized in that it comprises:
  means for mechanical coupling with said bars, said mechanical-coupling means comprising at least one first element made of insulating material having a shaped body, on which there are defined housing seats designed for enabling coupling of each to corresponding bars, insulating them from one another; and
  connection means operatively coupled to said first element so as to enable direct electrical connection between said bars and said apparatus.

In practice, the device according to the invention is obtained by means of a kit of components that are functionally intercorrelated which, once assembled, constitute a single functional block that is able to provide direct electrical and mechanical couplings, thus rendering superfluous the use of additional components.

Further characteristics and advantages of the invention will emerge more clearly from the description of preferred, but non-exclusive, embodiments of the device according to the invention, illustrated by way of indicative and non-limiting example in the attached plate of drawings, in which.

Figure 4:
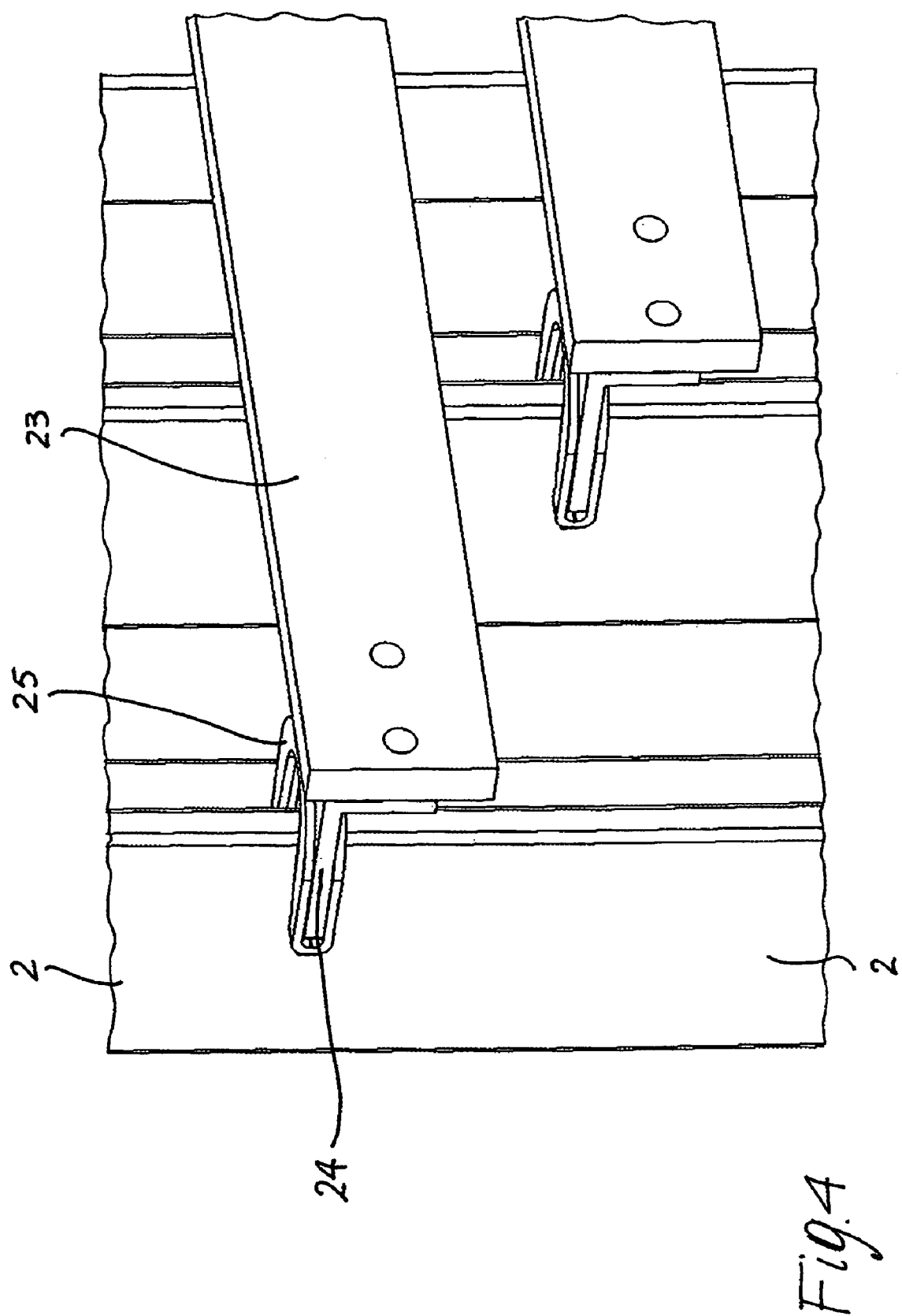
FIG. 4 is a detailed perspective view illustrating means for connection of the device coupled to a busbar.
Figure 5:
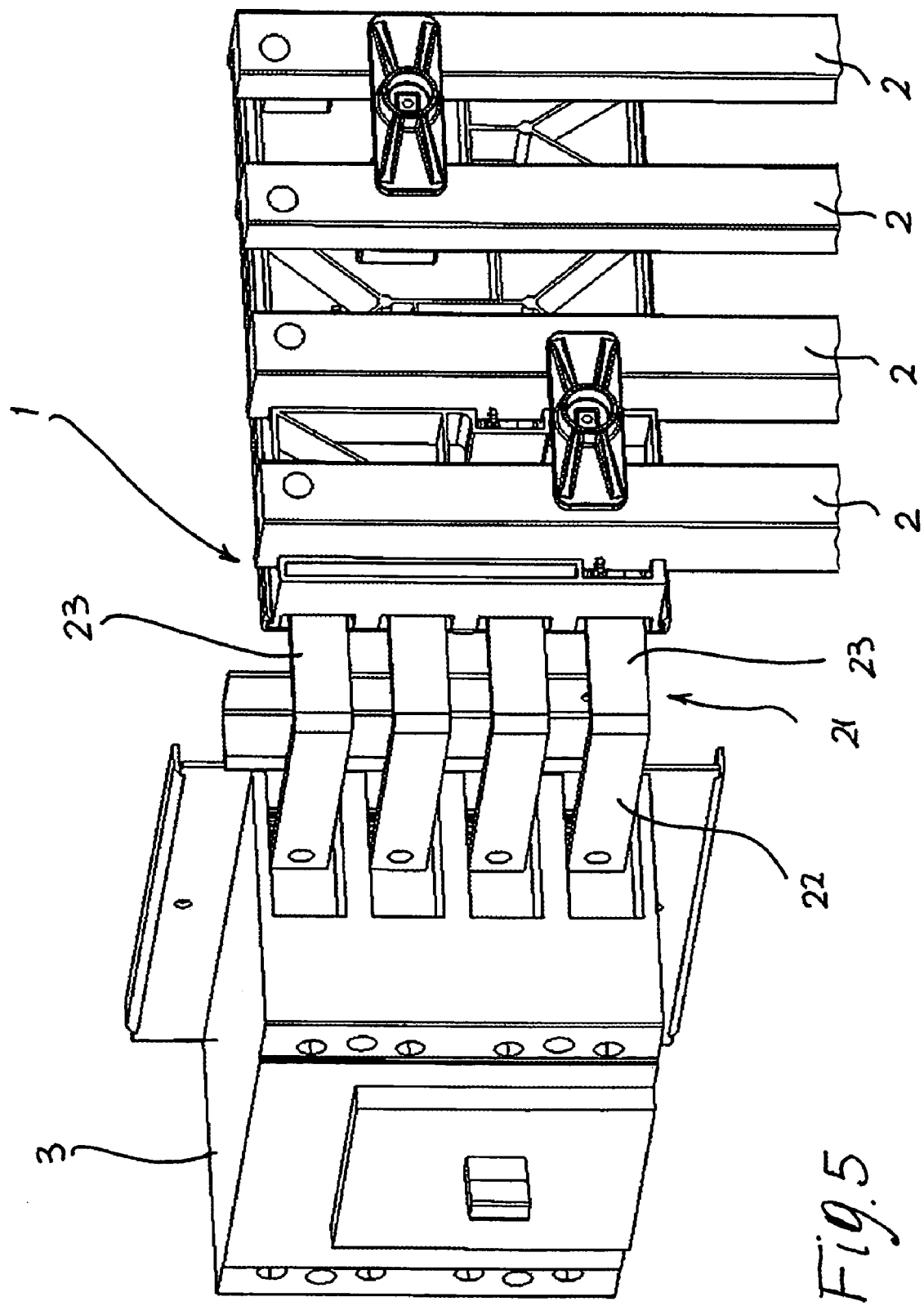
FIG. 5 is a perspective view illustrating schematically the device according to the invention connecting a system of busbars to an apparatus of an electrical switchboard.

With reference to the figures referred to above, the device according to the invention, designated as a whole in FIG. 5 by the reference number 1, comprises means of mechanical coupling with a plurality of bars, designated in FIGS. 4 and 5 by the reference number 2, and connection means which are operatively coupled to the coupling means so as to enable direct electrical connection between the bars 2 and at least one apparatus of an electrical switchboard; said apparatus is, for example, typically constituted by a power switch, designated in FIG. 5 by the reference number 3.

Figure 1:
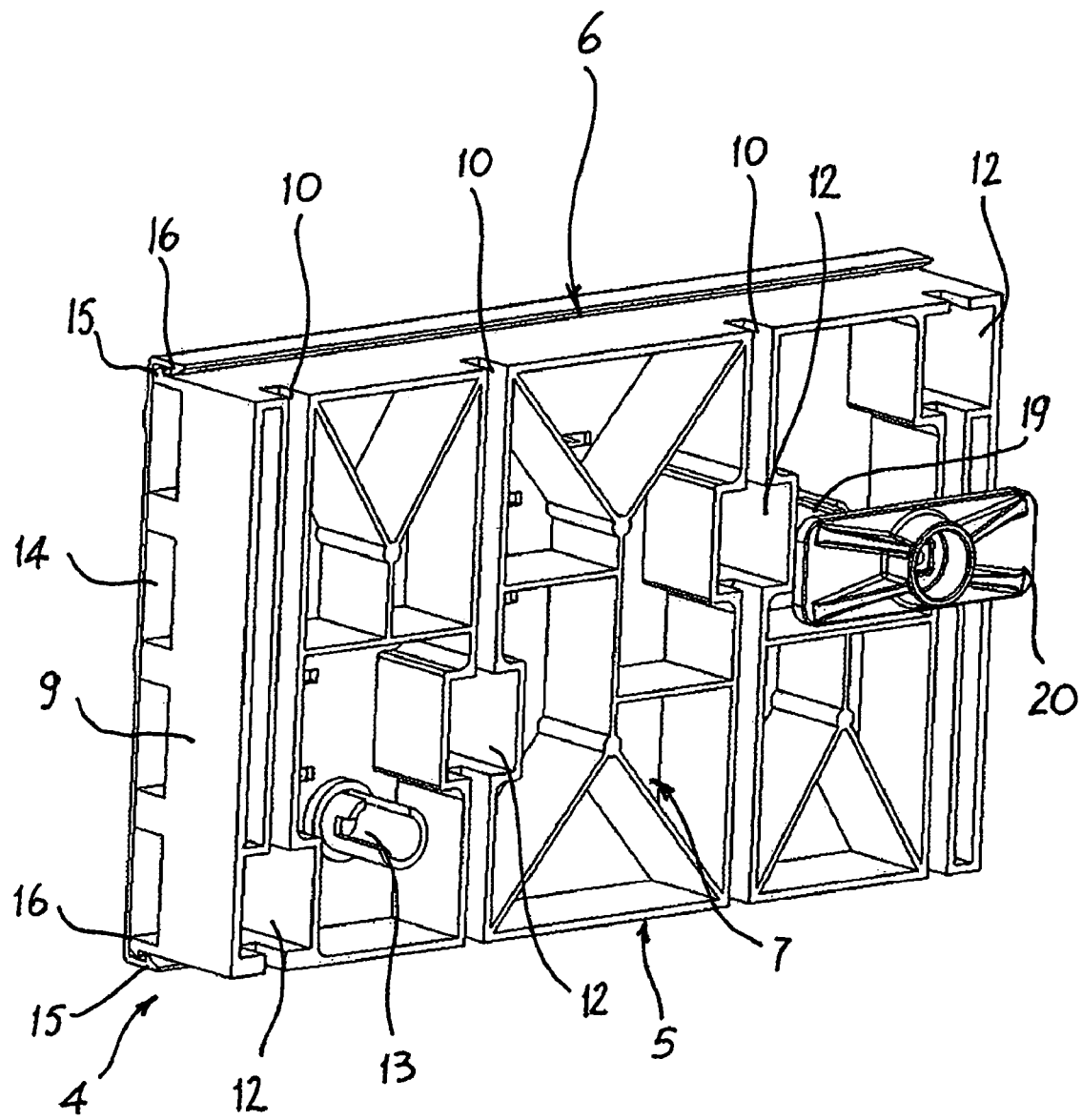
FIGS. 1 and 2 are perspective views, respectively a front view and a rear view, illustrating some components of the device according to the invention.
Figure 2:
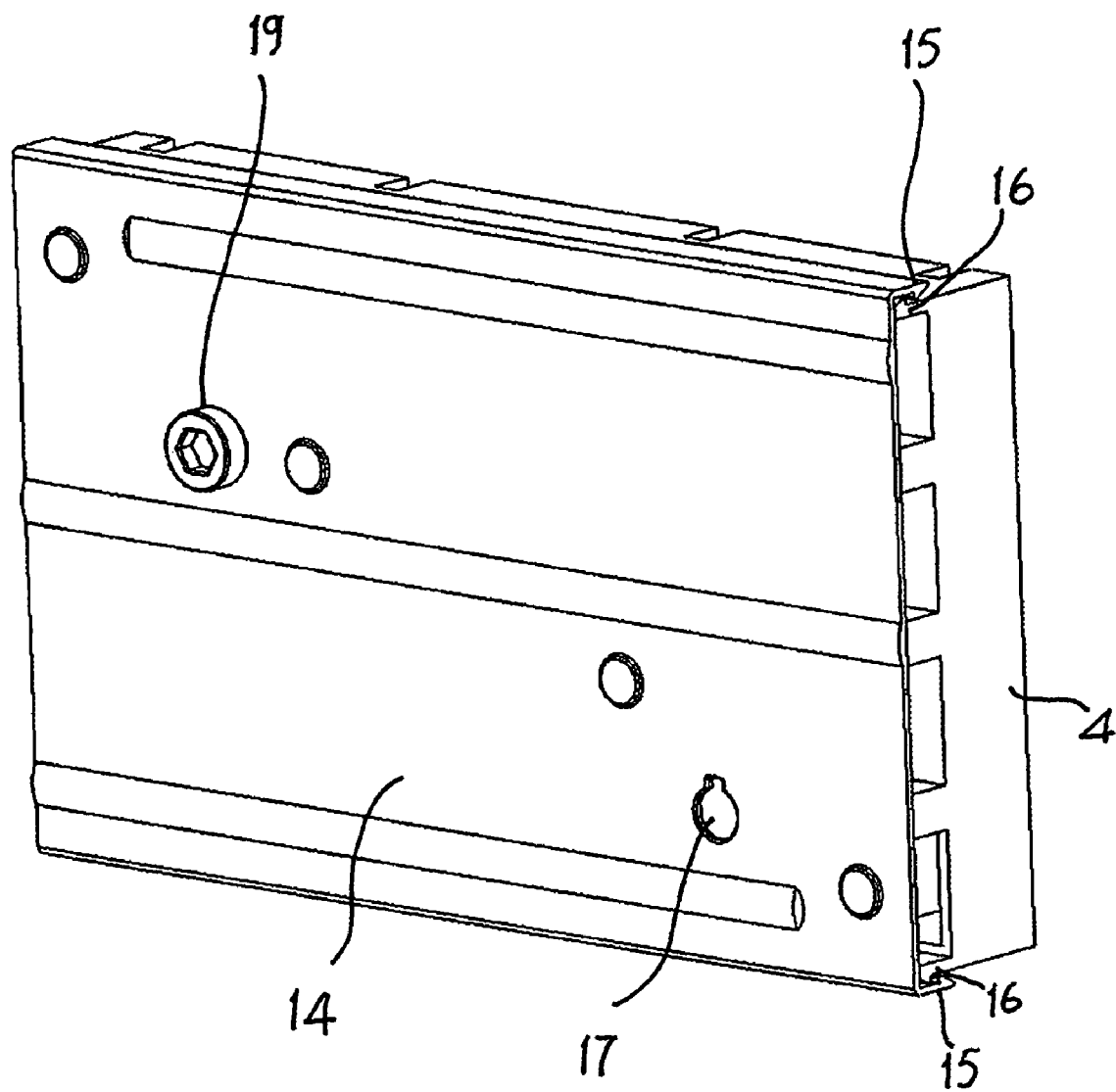
Figure 3:
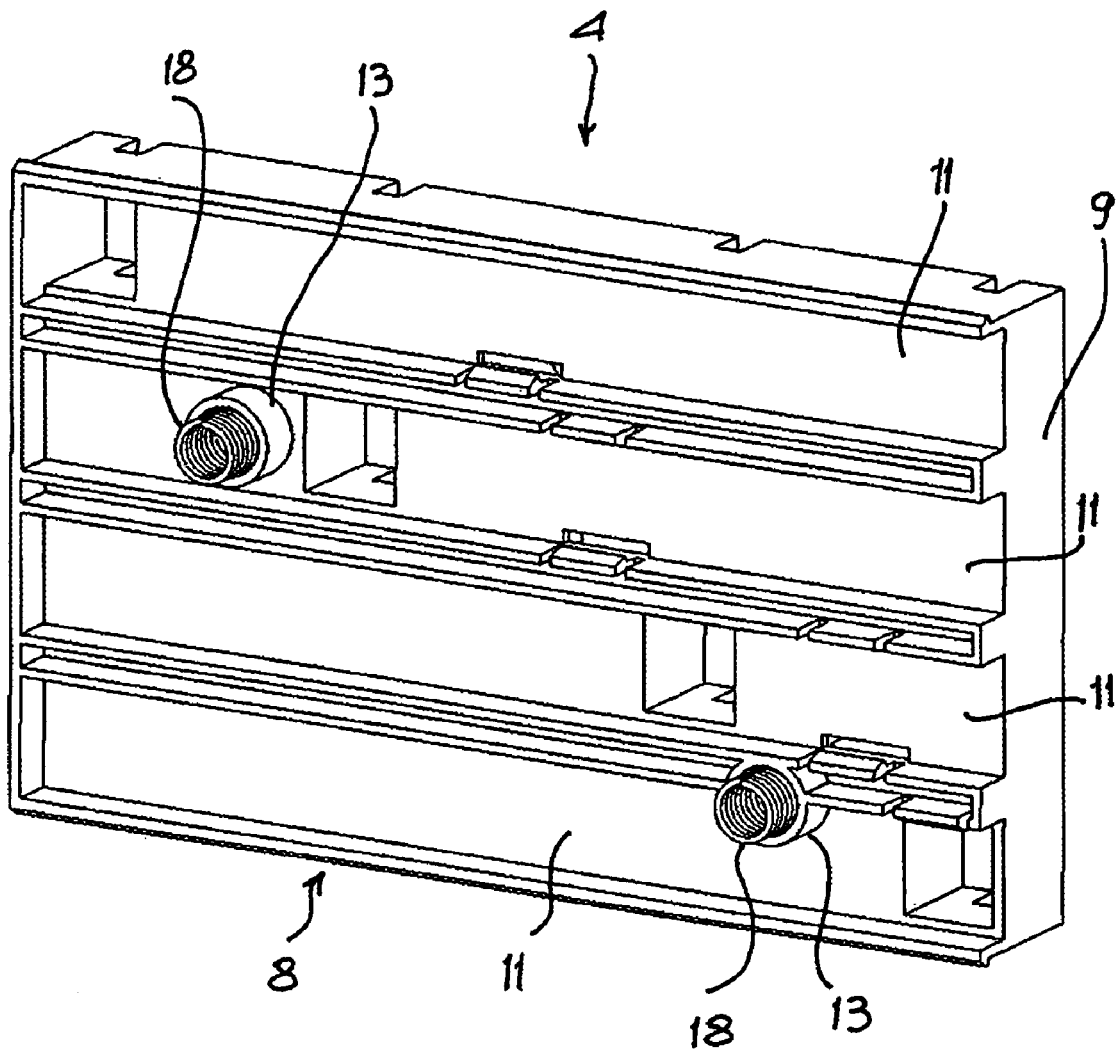
FIG. 3 is a perspective view illustrating the rear part of one of the components of FIG. 2 coupled to an elastic element.

As illustrated in FIGS. 1–3, the mechanical-coupling means comprise at least one first element 4 made of electrically insulating material, for example thermoplastic or thermosetting material. Said element 4 has a shaped body, for example substantially parallelepipedal, having a bottom face 5, a top face 6, a front face 7, a rear face 8, and two side faces 9.

Advantageously, on the element 4 there are defined housing seats 10, designed to couple each with a corresponding bar 2, thus keeping the bars isolated from one another. Preferably, said housing seats 10 are arranged an the front face 7 along the line joining the bottom face 5 and the top face 6, at a predefined distance, e.g., at a constant pitch, and substantially parallel to one another. Between the seats 10 there can preferably be provided ribbings for structural strengthening. Furthermore, as may be seen in detail in FIG. 3, the first insulating element 4 is provided with a plurality of longitudinal grooves 11, defined on the rear face 8 along the line joining the two side faces 9. In particular, said grooves 11 are arranged parallel and separate from one another, with one end open in an area corresponding to the edge of one of the two side walls 9, and are in number equal to the housing seats 10, in the case in point four.

On the first element 4 there is moreover defined a plurality of through openings 12, for example of a rectangular shape, as illustrated in FIG. 1, once again equal in number to the seats 10 and grooves 11. Each of said through openings 12 is set along the development of a corresponding housing seat 10 and sets said seat 10 in communication with a corresponding longitudinal groove 11. Furthermore, the openings 12 are arranged along the respective seats 10 at different distances from the bottom wall 7 or the top wall 6.

Preferably, on the insulating element 4 there is made at least one first through hole 13, set along the line joining the front face 7 and the rear face 8 and having edges projecting from both of the faces 7 and 8, which define a housing seat for the purposes and functions that will emerge more dearly from the ensuing description. In the embodiment illustrated there are, for example, provided two holes 13, as illustrated in FIG. 3.

In a particularly preferred embodiment, the mechanical-coupling means comprise retention and protection means operatively coupled to the first element 4 so as to favour its coupling and its withholding in a protected position with the connection means and with the bars 2.

Said retention and protection means comprise a second element 14, which is also made of insulating material, for example thermoplastic or thermosetting material, designed to be coupled to the first insulating element 4 on the rear face 8. Said second element 14 has, viewed laterally, a substantially U-shaped configuration with the two side branches having the free edges shaped so as to present surfaces 15 for clamping with surfaces 16 accordingly mated defined along two opposite edges of the rear face 8. In turn, the central branch is provided with at least one through hole 17, which is to be aligned with a through hole 13. In the embodiment illustrated, there are provided two through holes 17 (in FIG. 2, one of the two holes 17 is covered by a screw-shaped insulating element 19), each of which is to be aligned with a corresponding through hole 13. On the central branch of the element 14 there may moreover be provided strengthening ribbings.

In a preferred embodiment the retention and protection means further comprise: at least one elastic means 18, for example a spring, designed to be inserted into the seat defined by the rear edges of the through hole 13; at least one screw-shaped insulating element 19, designed to be inserted into the two aligned through holes 13 and 17; and at least one insulating body with a substantially planar development 20, which is to be fixed to the free end of the screw shaped insulating element 19 and is preferably provided with strengthening ribbings on the front face. In the embodiment illustrated (FIGS. 3 and 5), there are provided elastic means 18. for example two springs, two screw-shaped insulating elements 19, and two plane bodies 20 associated thereto.

Advantageously, in the device 1 according to the invention, the connection means comprise a shaped conductive element 21 made of electrically conductive material and having at least one first end surface for direct electrical connection to the apparatus 3, one second surface for mechanical coupling with the first insulating element 11, and one third surface, which can be coupled directly both electrically and mechanically to a corresponding bar. In the embodiment illustrated, the shaped conductive element 21 has: a first preferably substantially L-shaped portion, of which a first branch 22 has a free end, designed to be inserted directly in a coupling seat of the electrical apparatus 3, whilst the second branch 23 is designed to be positioned within a corresponding longitudinal groove 11 of the first insulating element. Advantageously, the shaped conductive element 21 has a second substantially pincer-shaped conductive element 24, which extends transversely from the second branch 23 of the L-shaped portion. Said pincer-shaped portion 24 is designed to be inserted in one of the through openings 12 and to grip a corresponding bar 2, as illustrated in FIG. 4. The pincer-shaped portion 24 is preferably provided, in a median area from which there branch off the two pincers, with a longitudinal notch, designed to provide it with characteristics of elastic deformability so as to facilitate gripping with the bars 2. Finally, there is preferably provided an elastic element 25 mounted on the pincer-shaped portion 24 so as to favour its clamping by pressure on the bar 2.

In practice, in the assembly stage, the insulating element 4 is directly connected to the bars, by insertion of each bar 2 in a corresponding coupling seat 10. A shaped conductive element 21 is coupled to the first element 4, with the branch 23 of the L-shaped portion inserted in a longitudinal groove 11, and the pincer-shaped body 24 that is inserted in a through opening 12 and thus grips the corresponding bar 2, so clamping it. In particular, as illustrated in FIG. 5, conductive elements 21 are used in a number equal to that of the bars. Each element 21 is inserted, with its own branch 23, into a groove 11 and with the pincer 24 which is then inserted into the corresponding opening 12,so gripping the respective bar 2. Said elements 21 differ from one another simply in the different length of the branch 23 according to the groove 11 in which they are inserted. The branches 23 extend externally from the grooves 11 in such a way that the free edges of the branches are inserted directly into the corresponding terminals for connection of the switch 3, as illustrated in FIG. 5. In turn, the second element 14 is coupled to the first element 4, so clamping together the respective surfaces 15 and 16. In this way, the element 14 covers the rear part of the element 4, closing the longitudinal grooves 11 at the top and insulating the rear parts of the elements 21, with the two through holes 17 that are aligned to the two corresponding through holes 13.

Each screw shaped insulating element 19 is inserted into the two aligned holes 13–17, then coming out from the front face 7. At the free end of each screw shaped insulating element 19 there is then fixed the respective insulating plane body 20. By gripping the element 19, there is in practice obtained gripping of the latter on the second element 14 by countering the action of the spring 18 previously inserted into the seat defined by the projecting edges of the hole 13. By virtue of gripping, tanks to the combined action of the spring 18 and of the screw shaped insulating element 19 that work in mutual antagonism, there is a pulling effect which, on the one hand, presses the element 14 in the direction of the element 4, and on the other pulls the body 20 so that it rests in the direction of a pair of adjacent bars. In this way, there is obtained a "packed" set in the desired coupling position and providing protection on one side, thanks to the element 14, and on the other thanks to the action of the spring 18/screw shaped insulating element 19 and the plane element 20, which in practice constitute a safety key.

It has in practice been found that the device according to the invention, thanks to the innovative structure and functionality of its parts, fully accomplishes the pre-set task by providing a series of advantages as compared to the known art. In fact, as previously described, the device 1 is obtained by means of a kit of components which, when assembled, constitute as a whole a single functional block such as to provide simultaneously direct electrical and mechanical coupling between the parts, according to a solution that is simple from the constructional standpoint, is functionally effective, and facilitates considerably assembly as compared to the solutions of the known art. In particular, decidedly simplified is the electrical connection to the equipment, typically the switches, thanks to fact that the part that conducts the current from the bars, typically the element 21, is inserted directly into the respective terminal of the switch in such a way that for final connection, nothing else remains for the operator to do but to screw the corresponding terminal, without having to use any additional components. Likewise, also the connection to the bars is obtained in a direct and secure way via direct clamping of the pincer-shaped body 24 and without any intermediate components or additional operations of assembly. Further benefits are achieved from the standpoint of protection and safety, since the device 1 can integrate, in its structure, elements that are able to provide functions of protection, both in the rear part of the area of coupling with the bars and in the front part, in which an anti-tampering key system is obtained, thus rendering the interventions of maintenance safer. Finally, the configuration that is obtained is extremely compact, enabling optimal exploitation of the spaces available so as to make available space for other components or reduce the overall dimensions of the cabinet of the switchboard.

Clearly, what has been described previously for the connection of the system of bars 2 to just one apparatus can be used in an altogether similar manner when an electrical switchboard, as is usually the case, comprises a number of apparatuses, for example different types of switches, each of which is to be connected to the bars. In this case, it is sufficient to use a number of devices 1, positioned along the development of the bars and mounted according to what has been described previously so as to connect the bars to each single apparatus. A further subject of the present invention is therefore represented by a low-voltage electrical switchboard, characterized in that it comprises one or more connection devices 1 of the type described previously.

The device thus devised may undergo numerous modifications and variations, all falling within the scope of the inventive idea; moreover, all the items may be replaced by other technically equivalent elements. For instance, the shaping and/or positioning and/or number of the various seats or grooves or holes or other parts, as likewise the shaping, for example, of the elements 4 or 14, could be varied provided that they are compatible with the functions for which they are conceived.

In practice, the materials, as well as the dimensions, may be any whatsoever according to the requirements and the state of the art.

The invention claimed is:

1. A device for connection of a plurality of busbars to at least one apparatus of an electrical switchboard, comprising:
   mechanical-coupling means with said busbars, said mechanical-coupling means comprising at least one first insulating element made of insulating material having a shaped body, on which there are defined housing seats, designed to couple each with corresponding busbars and insulate the busbars from one another,
   wherein said first insulating element has a substantially parallelepipedal body having a bottom face, a top face, a front face, a rear face, and two side faces, said housing seats being arranged on said front face along the line joining said bottom and top faces, at a predefined distance from one another; and
   connection means, operatively coupled to said first insulating element so as to enable direct electrical connection between said busbars and said apparatus.

2. The device according to claim 1, further comprising said coupling means that comprise retention and protection means, operatively coupled to said first insulating element so as to couple and withhold in a protected position with said connection means and with the busbars.

3. The device according to claim 1, further comprising said first insulating element provided with a plurality of longitudinal grooves defined on said rear face along the line joining the two side faces.

4. The device according to claim 3, further comprising, on said first insulating element, a plurality of through openings, each through opening setting a housing seat in communication with a corresponding longitudinal groove.

5. The device according to claim 4, further comprising, on said first insulating element, at least one first through hole set along the line joining the front and rear faces.

6. The device according to claim 4, further comprising retention and protection means that comprise a second element made of insulating material, designed to be coupled to the first insulating element on the rear face, said second element having a substantially U-shaped configuration with the two side branches having the free edges shaped so as to present surfaces for clamping with accordingly mating surfaces, defined along two edges of the rear face, the central branch being designed to cover longitudinal grooves at the top and being provided with at least one second through hole, which is to be aligned with said first through hole.

7. The device according to claim 4, further comprising retention and protection means that comprise at least one elastic means, designed to be inserted in said first through hole, a screw-shaped insulating element, designed to be inserted in said first and second through holes and to be gripped on the central branch of the second element in antagonism with said elastic means, and a substantially flat insulating body, designed to be fixed to the free end of said screw element so as to be pulled so that it rests on a pair of adjacent bars during gripping.

8. The device according to claim 3, further comprising, on said first insulating element, at least one first through hole set along the line joining the front and rear faces.

9. The device according to claim 3, further comprising retention and protection means that comprise a second element made of insulating material, designed to be coupled to the first insulating element on the rear face, said second element having a substantially U-shaped configuration with the two side branches having the free edges shaped so as to present surfaces for clamping with accordingly mating surfaces, defined along two edges of the rear face, the central branch being designed to cover longitudinal grooves at the top and being provided with at least one second through hole, which is to be aligned with said first through hole.

10. The device according to claim 3, further comprising retention and protection means that comprise at least one elastic means, designed to be inserted in said first through hole, a screw-shaped insulating element, designed to be inserted in said first and second through holes and to be gripped on the central branch of the second element in antagonism with said elastic means, and a substantially flat insulating body, designed to be fixed to the free end of said screw element so as to be pulled so that it rests on a pair of adjacent bars during gripping.

11. The device according to claim 1, further comprising, on said insulating element, at least one first through hole set along the line joining the front and rear faces.

12. The device according to claim 11, further comprising retention and protection means that comprise a second element made of insulating material, designed to be coupled to the first insulating element on the rear face, said second element having a substantially U-shaped configuration with the two side branches having the free edges shaped so as to present surfaces for clamping with accordingly mating surfaces, defined along two edges of the rear face, the central branch being designed to cover longitudinal grooves at the top and being provided with at least one second through hole, which is to be aligned with said first through hole.

13. The device according to claim 1, further comprising retention and protection means that comprise a second element made of insulating material, designed to be coupled to the first insulating element on the rear face, said second element having a substantially U-shaped configuration with the two side branches having free edges shaped so as to present surfaces for clamping with accordingly mating surfaces, defined along two edges of the rear face, the central branch being designed to cover longitudinal grooves at the top and being provided with at least one second through hole, which is to be aligned with a first through hole.

14. The device according to claim 1, further comprising retention and protection means comprise at least one elastic means, designed to be inserted in said first through hole, a screw-shaped insulating element, designed to be inserted in said first and second through holes and to be gripped on the central branch of the second element in antagonism with said elastic means, and a substantially flat insulating body, designed to be fixed to the free end of said screw element so as to be pulled so that it rests on a pair of adjacent bars during gripping.

15. The device according to claim 1, further comprising said connection means that comprise a shaped element made of conductive material and having at least one first end surface for direct electrical connection to said apparatus, one second surface for mechanical coupling to said first insulating element, and one third surface, which is designed for direct electro-mechanical coupling to a corresponding bar.

16. The device according to claim 15, further comprising said shaped conductive element has a first substantially L-shaped portion, a first branch of said L having a free end, designed to be inserted directly in a coupling seat of the electrical apparatus, the second branch being designed to be inserted within a corresponding longitudinal groove of the first insulating element.

17. The device according to claim 16, further comprising said shaped conductive element has a second substantially pincer-shaped conductive element, which extends transversely from the second branch of the first L-shaped portion, said pincer-shaped portion being designed to be inserted in at least one through openings of the first insulating element and to grip a corresponding busbar.

18. The device according to claim 17, further comprising an elastic element mounted on said pincer-shaped portion so as to favour its gripping by pressure on the busbar.

19. A low-voltage electrical switchboard, further comprising at least one connection device according to claim 1.

* * * * *